United States Patent [19]

Landis et al.

[11] Patent Number: 4,919,482
[45] Date of Patent: Apr. 24, 1990

[54] INERTIA LATCH FOR VEHICLE SEATS

[75] Inventors: David E. Landis, Oxnard, Calif.;
Douglas G. Del Grosso, Canton, Mich.

[73] Assignee: Lear Siegler Seating Corp., Southfield, Mich.

[21] Appl. No.: 4,961

[22] Filed: Jan. 20, 1987

[51] Int. Cl.$^5$ .............................................. B60N 1/04
[52] U.S. Cl. ...................................... 297/379; 297/378
[58] Field of Search ................................. 297/378, 379

[56] References Cited

U.S. PATENT DOCUMENTS

| Re. 31,741 | 11/1984 | Strowick et al. | 297/379 X |
| 4,147,386 | 4/1979 | Stolper | 297/379 X |
| 4,318,569 | 3/1982 | Bilenchi et al. | 297/379 |
| 4,382,630 | 5/1983 | Weston | 297/379 X |
| 4,438,974 | 3/1984 | Kresky et al. | 297/379 |

FOREIGN PATENT DOCUMENTS 1546104 5/1979 United Kingdom ................ 297/379

Primary Examiner—Peter R. Brown
Attorney, Agent, or Firm—Reising, Ethington, Barnard, Perry & Milton

[57] ABSTRACT

An inertia responsive latch mechanism for vehicle seats including an inertia latch member (22) pivotally mounted on a back frame member (18). The back frame member (18) is pivotally supported by the support frame (12). The inertia latch member (22) coacts in a first position with the support frame (12) for limiting forward pivoting movement of the back frame from an upright position only when the initial forward movement of the back frame (18) exceeds a predetermined acceleration. The assembly is characterized by the support frame including a lip (34) to automatically coact with the inertia latch member (22) in a second position in the forwardly folded position for automatically locking the back frame in the forwardly folded position. A lever (36) is included to remove the inertia latch element from the second coacting position to allow the back frame member (18) to return to the upright seating position.

17 Claims, 5 Drawing Sheets

INERTIA LATCH FOR VEHICLE SEATS

TECHNICAL FIELD

The present invention relates to inertia responsive latch mechanisms for vehicle seats.

BACKGROUND ART

Inertia responsive latch mechanisms for vehicle seats are well known in the prior art. For example, the U.S. Pat. Nos. 4,318,569 to Bilenchi et al issued Mar. 9, 1982, and the U.S. Pat. No. 4,438,974 to Kresky et al issued Mar. 27, 1984, disclose such inertia responsive latch mechanisms. The '569 and '974 patent disclose seat back latch mechanism comprising a latch pall which is pivotally mounted on a seat back frame and arranged so that gravity will cause the pall to swing out of latching attitude when a force is applied to the seat back at less than a predetermined acceleration. When a predetermined acceleration of the seat back has been reached, the latch pall engages a shoulder and prevents forward tilting of the seat.

The aforementioned members employ a single inertia latch element which is maintained in a cam-controlled latching attitude relative to a fixed detent or shoulder. The inertia latch element will engage the detent or shoulder when a predetermined acceleration of the seat back has been reached. If this predetermined acceleration is not reached, gravity will cause the inertia element to rotate out of latching attitude with the detent or shoulder, thus allowing the seat to move to the forward position.

None of the known inertia latch assemblies show the feature of locking the seat in the forward position by the inertia latch element until manually released.

SUMMARY OF THE INVENTION AND ADVANTAGES

Accordingly, there is provided a seat assembly having a forward folding back for use in a vehicle. The assembly comprises a support frame for fixed support in a vehicle, and a back frame member pivotally supported by the support frame for forward pivoting movement between an upright seating position and a forward folded position. The assembly further includes an inertia latch member rotatably mounted on the back frame to coact in a first position with the support frame for limiting forward pivoting movement of the back frame from the upright position only when the initial forward movement thereof exceeds a predetermined acceleration. The assembly is characterized by the support frame including locking means to automatically coact with the inertia latch member in a second position in the forwardly folded position for automatically locking the back frame in the forwardly folded position.

Accordingly, there is provided a seat assembly in which an inertia latch member coacts in a first position to limit forward pivoting movement of the back frame member and coacts in a second position to automatically lock the back frame in the forwardly folded position, preventing inadvertent movement of the back frame from the forwardly folded position to the upright seating position. This feature is desirable in that the seat can be positively locked in the forward folding position. This allows cargo to be stored thereon without the seat raising up.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Referring to the figures, a seat assembly having a forwardly folding back for use in a vehicle is generally shown at 10.

The assembly 10 includes a support frame generally indicated at 12 for fixed support in a vehicle. The support frame 12 is fixedly secured to the seat frame 14 using fastening means 16 such as bolts and nuts, rivets, or any similar means to fixedly secure the support frame 12 to the seat frame 14.

Figure 1:
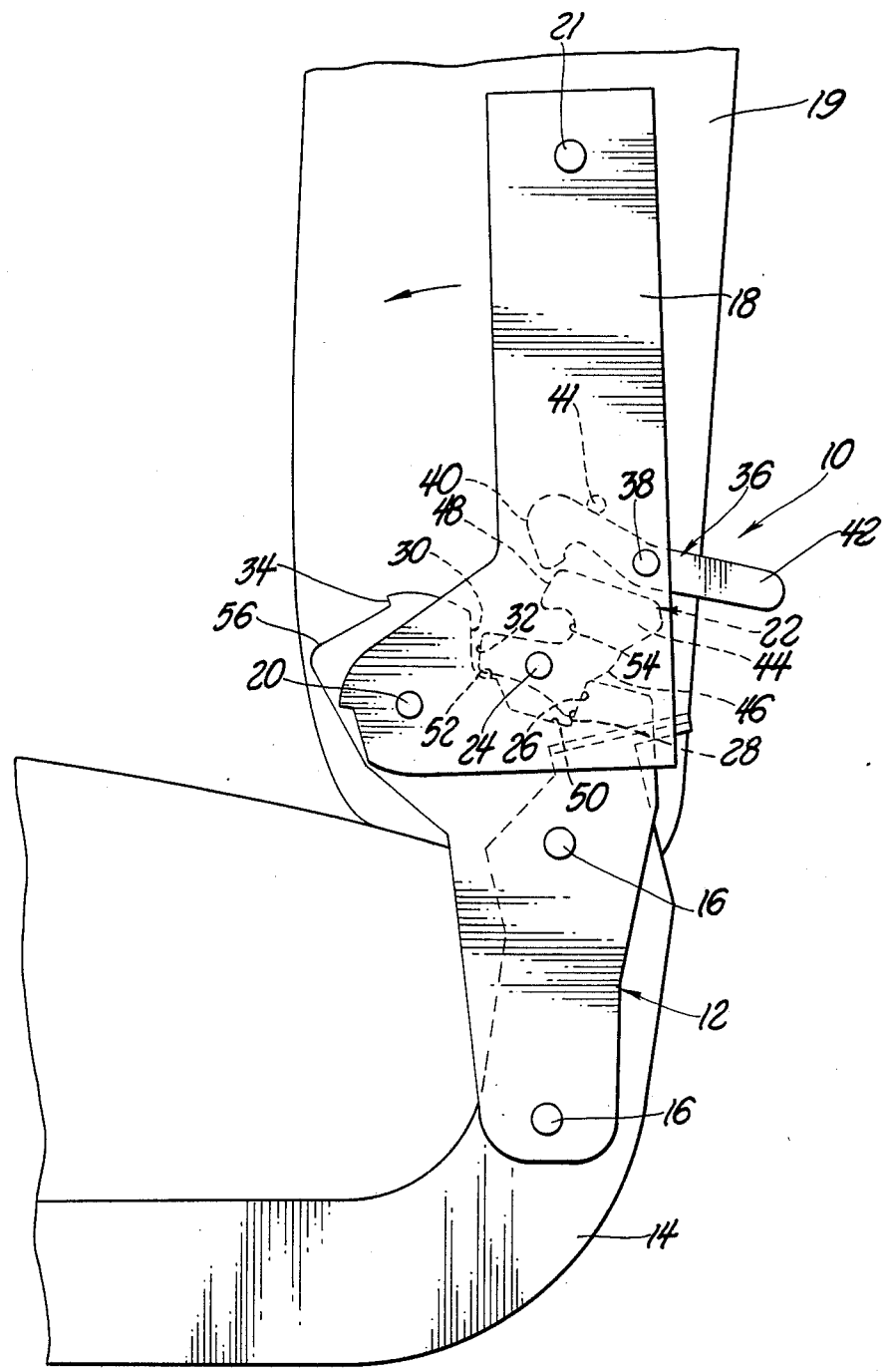
FIG. 1 is a side view of the preferred embodiment of the present invention in the upright seating position.
Figure 5:
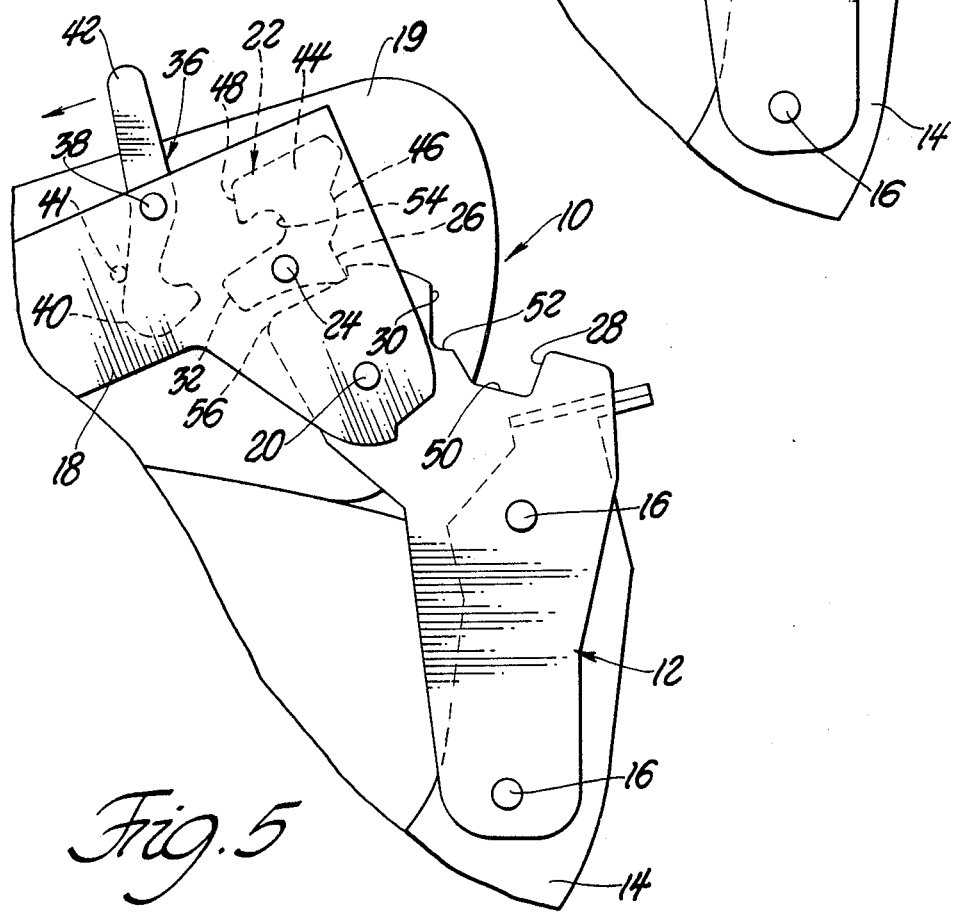
FIG. 5 is a side view of the preferred embodiment of the present invention in the second coacting position preventing movement back to the upright position.

A back frame member 18 is included in the assembly 10. The back frame member 18 is fixedly secured to the back 19 of vehicle seat. The back frame member 18 is fixedly secured to the back 19 at the connection 21. The connection 21 may comprise a bolt, screw, rivet, or any other suitable means for providing a fixed connection of the back frame member 18 to the seat back 19. Since the back frame member 18 is fixed to the seat back 19, any motion imparted to the seat back 19 is imparted to the back frame member 18. The back frame member 18 is pivotally supported by the support frame 12 at the pivot 20. The pivot 20 may comprise a pin or rod or any other similar construction which allows the back frame member 18 to rotate relative to the support frame 12. The back frame member 18 pivots between an upright seating position (as shown in FIG. 1) and a forwardly folded position (as shown in FIG. 5).

The assembly further includes an inertia latch member generally indicated at 22. The inertia latch member 22 is pivotally mounted on the back frame member 18 at the connection 24. The connection 24 may comprise a pin through the latch member 22 and the back frame member 18 or similar connection about which the inertia latch member 22 can pivot relative to the back frame member 18. The inertia latch member is rotatably mounted on the back frame member 18 to coact in a first position with the support frame 12 for limiting forward pivoting movement of the back frame member 18 from the upright position only when the initial forward movement of the back frame member 18 exceeds a predetermined acceleration.

The assembly 10 is characterized by the support frame 12 including locking means to automatically coact with the inertia latch member 22 in a second position in the forwardly folded position for automatically locking the back frame member 18 in the forwardly folded position.

The inertia latch member 22 includes an abutment portion 26. The support frame 12 includes a rear shoulder 28. The abutment portion 26 engages the rear shoulder 28 when the assembly is in the upright seating position, as shown in FIG. 1. In this position, the seat is prevented from tilting to the right as viewed in FIG. 1.

Figure 2:
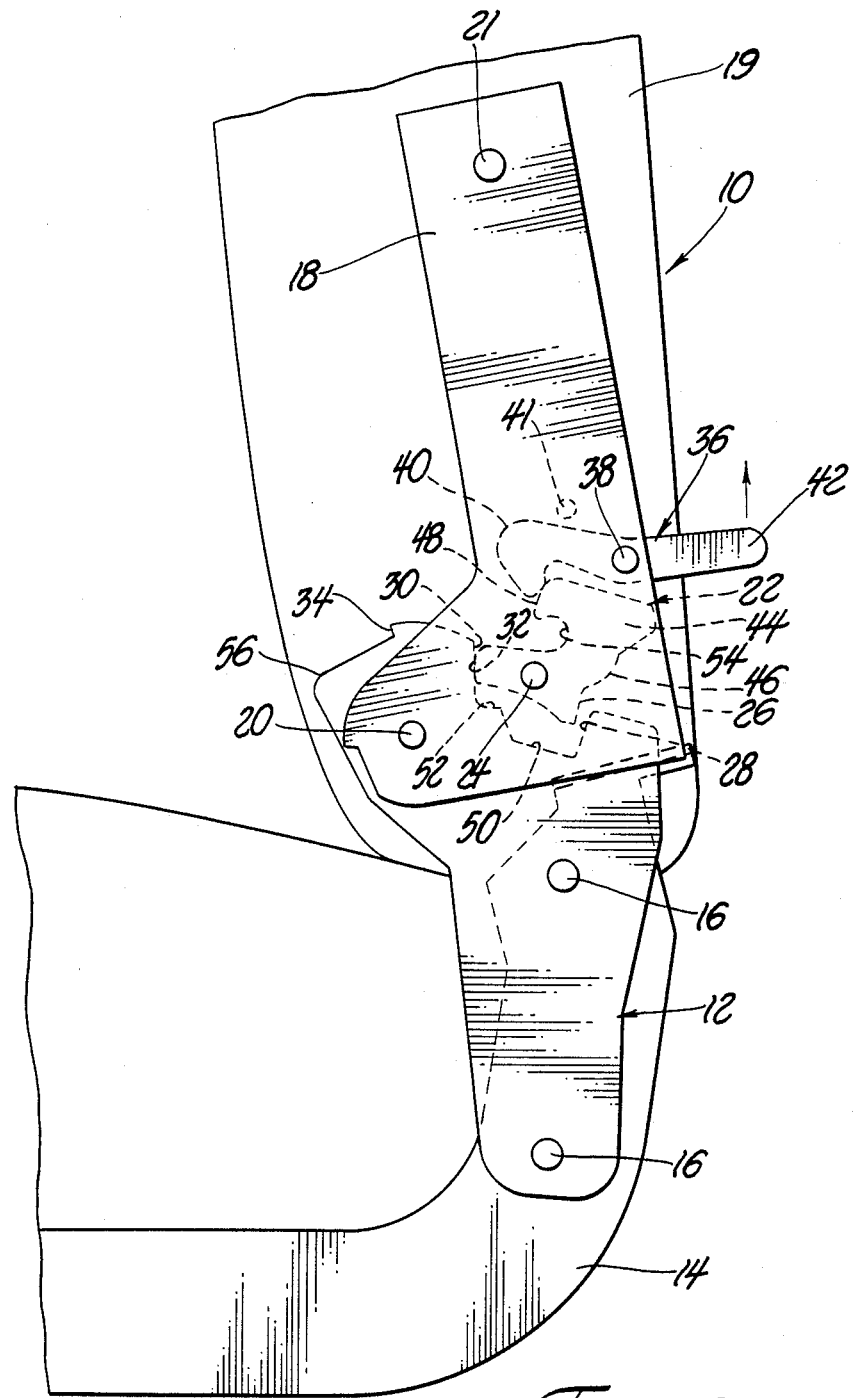
FIG. 2 is a side view of the preferred embodiment of the present invention in the first coacting position limiting forward folding movement.

The support frame further includes a front shoulder 30, and the inertia latch member 22 further includes a lower head portion 32. The lower head portion 32 is engageable with the front shoulder 30 in the first position in response to a predetermined acceleration (FIG. 2). In this position, the back frame member 18 is prevented from moving forward, to the left as viewed in FIG. 2, to the forwardly folded position.

The connection 24 of the inertia latch member 22 is located between the lower head portion 32 and the abutment portion 26. This allows the lower head portion 32 to rotate about the connection 24.

The locking means includes a lip 34 presented by the support frame 12. The lip 34 is for engaging the abutment portion 26 of the inertia latch member 22 for locking the back frame member 18 in the second position in the forwardly folded position (FIG. 5). In this position, the back frame member 18 is prevented from rotating to the right as viewed in FIG. 5 to the upright seating position.

The assembly 10 further includes release means for manually removing the inertia latch member 22 from the second position (FIG. 6) for allowing return of the back frame member 18 from the forwardly folded position to the upright seating position. The release means comprises a lever member, generally indicated at 36, pivotally mounted on the back frame member 18 at the pivot 38. The pivot 38 comprises a pin or any other similar construction which allows the lever member 36 to pivot relative to the back frame member 18. The lever member 36 includes a hook 40 for engaging the inertia latch member 22 and a tail 42 extending from the hook 40 and protruding from the back frame member 18 and from the seat back 19 for applying manual forces thereto to rotate the inertia latch member 22. Upward pivotal movement of the lever member 36 is limited by a stop 41 attached to the back frame member 18.

The lever member 36 is further engageable with the inertia latch member 22 for rotating the inertia latch member 22 from the first coacting position to move the lower head portion 32 out of engagement with the front shoulder 30. This allows the back frame member 18 to move from the upright position to the forwardly folded position. Specifically, the inertia latch member 22 includes an upper head portion 48 for engaging the hook 40 of the lever member 36 for rotating the inertia latch member 22 in response to forces applied to the upper head portion 48 by the lever member 36 (FIG. 2).

The lower head portion 32 and the upper head portion 48 define a generally c-shaped recess 54 therebetween. The hook 40 of the lever member 36 engages the inertia latch member 22 at the lower head portion 32 and the hook is substantially inserted inside the c-shaped recess 54 to rotate the abutment portion 26 of the inertia latch member 22 out of engagement with the lip 34 and out of the locked position.

The inertia latch member 22 further contains a counter weighted portion 44 to rotate the inertia latch member 22 in response to slow forward movement of the back frame member 18 at less then the predetermined acceleration. The counter weight portion 44 allows the lower head portion 32 of the inertia latch member 22 to rotate over the front shoulder 30 of the support frame 12 to allow the back frame member 18 to move to the forwardly folded position.

The inertia latch member 22 further includes a primary cam surface 46 for engaging the rear shoulder 28 of the support frame 12 to rotate and guide the inertia latch member 22. The primary cam surface 46 guides the inertia latch member 22 so that the lower head portion 32 of the inertia latch member 22 is allowed to pass over the front shoulder 30 of the support frame 12 in response to slow forward movement of the back frame member. The primary cam surface is generally m-shaped.

The support frame 12 has an upper portion which extends from the rear shoulder 28 through a valley portion 50 and upwardly to a plateau 52. The plateau 52 defines a base extending from the lower end of the front shoulder 30. From the front shoulder 30, the upper portion of the support frame 12 extends curvelineraly to the lip 34. The upper portion of the support frame 12 further extends from the lip 34 to an end 56.

In operation, the back frame member is initially in the upright seating position, as viewed in FIG. 1. In this position, the abutment portion 26 of the inertia latch member is engaged with the rear shoulder 28 of the support frame 12. This engagement prevents the back frame member from being moved to the right as viewed in FIG. 1.

If the seat is suddenly moved forward, to the left as viewed in FIG. 1, at faster than a predetermined acceleration, the lower head portion 32 of the inertia latch member 22 will engage and coact with the front shoulder 30 of the support frame 12, as seen in FIG. 2, in a first position, and prevent the back frame member 18 from moving to the forwardly folded position. Such rapid movement may occur for example during a collision. In such a case, the back frame member is prevented from moving to the forwardly folded position. The inertia latch member 22 can be rotated out of the first position and out of engagement with the front shoulder 30 by applying a an upward force to the tail 42 of the latch member 36. This force will be transmitted to the upper head portion 48 of the inertia latch member 22 and cause it to rotate. This allows the lower head portion 32 to pass over the front shoulder 30; thus allowing the back frame member 18 to rotate to the forwardly folded position.

Figure 3:
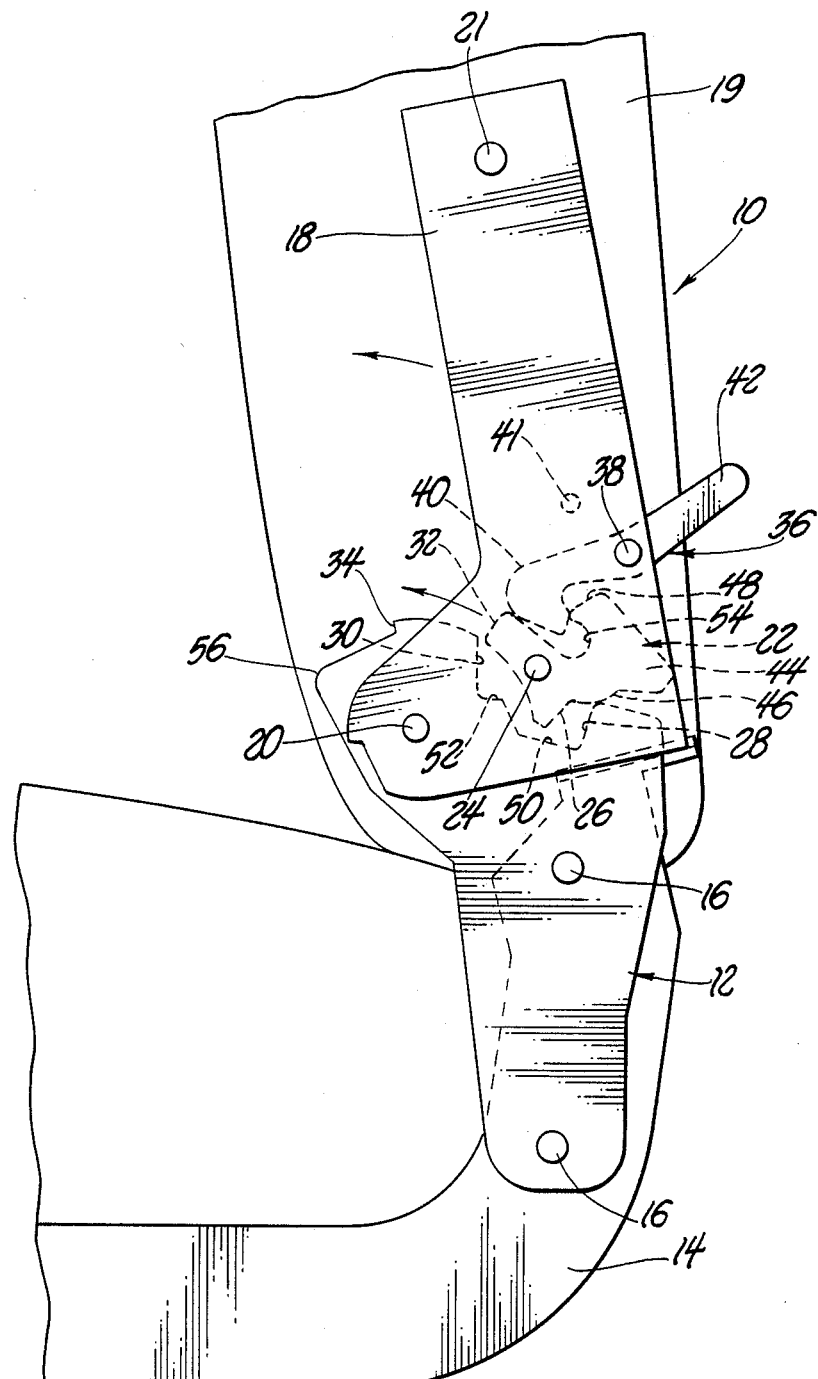
FIG. 3 is a side view of the preferred embodiment of the present invention showing the components during the normal slow forward folding movement.

Alternatively, the back frame member 18 can be moved to the forwardly folded position in response to the slow forward movement at less then a predetermined acceleration from the upright seating position. If the back frame member 18 is slowly tilted forward, to the left as viewed in FIG. 1, the counter weighted portion 44 of the inertial latch member falls, i.e. rotates the primary cam surface 46 into engagement with the upper corner of the rear shoulder 28, in response to gravitational forces. This causes the generally m-shaped cam surface 46 to follow the upper corner of the rear shoulder 28 and guide the lower head portion 32 over the front shoulder 30, as shown in FIG. 3. The abutment portion 26 is free to move through the valley portion 50, and thus does not engage the support frame 12. This allows the back frame member 18 to move to the forwardly folded position from the upright seating position. Should the forward movement exceed the predetermined acceleration, the counter weighted portion 44 will not have time to fall, i.e. rotate the primary cam surface 46 into engagement with the upper corner of the rear shoulder 28 in response to gravity, and this will cause the lower head portion 32 to engage front shoulder 30 as previously described and shown in FIG. 2.

Figure 4:
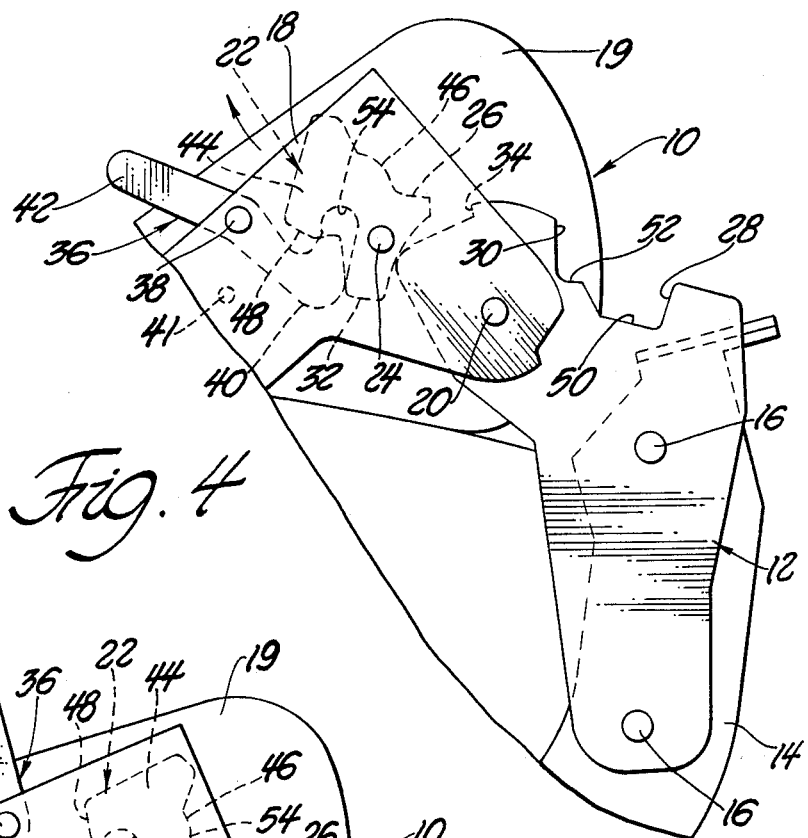
FIG. 4 is a side view of the preferred embodiment of the present invention in the extreme forward position.

Once the lower head portion 32 is moved over the front shoulder 30, the back frame member 18 can be moved to the extreme forward position, as shown in FIG. 4. In this position, the abutment portion 26 of the inertia latch member is moved sufficiently past the lip 34 of the support frame 12. As the back frame member is moved toward the upright seating position, the generally curvelinear outer portion of the lower head portion 32 engages the end 54 of the back frame member 12 and acts as a secondary cam surface. This causes rotation of the inertia latch member 22 to the right as the viewed in FIG. 4. The counter weighted portion 44 then falls in response to gravity to automatically cause the abutment portion 26 to coact in a second position with the lip 34. This automatically locks the back frame member 22 in the forwardly folded position, as viewed in FIG. 5. This forwardly locked position is desirable so that inadvertent return of the seat to the upright position from the forwardly folded position is avoided.

Figure 6:
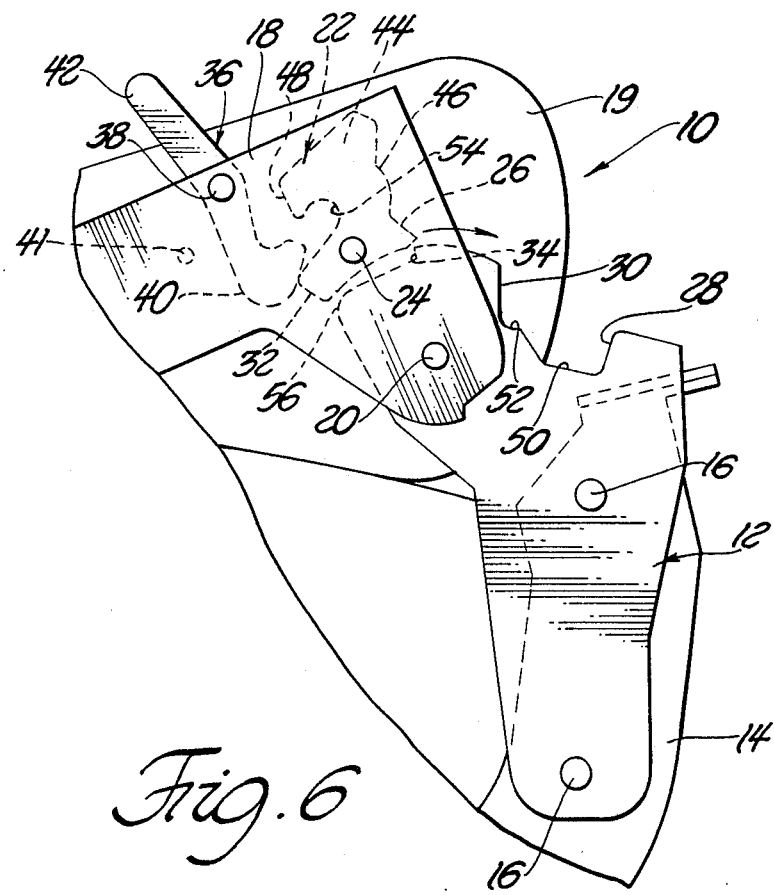
FIG. 6 is a side view of the preferred embodiment of the present invention showing the components in a position to be returned to the upright seating position.

To return the back frame member 18 to the upright seating position from the forwardly folded position, a leftward force, as viewed in FIG. 6, must be applied to the tail 42 of the lever member 36. This force is transmitted to the lower head portion 32 of the inertia latch member 22 through the hook 40. The outside of the hook 40 engages the lower head portion 32 and causes the inertia latch member 22 to rotate. This releases the abutment portion 26 from the lip 34 and out of the second position (see FIG. 6). The back frame member 18 is then free to rotate to the upright seating position of FIG. 1.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A seat assembly (10) having a forward folding back for use in a vehicle and comprising;
   a support frame (12) for fixed support in a vehicle,
   a back frame member (18) pivotally supported by said support frame (12) for forward pivoting movement between an upright seating position and a forwardly folded position,
   an inertia latch member (22) rotatably mounted on said back frame member (18) to coact in a first position with said support (12) frame for limiting forward pivoting movement of said back frame member (18) from said upright position only when the initial forward movement thereof exceeds a predetermined acceleration, said assembly (10) characterized by said support frame (12) including locking means to automatically coact with said inertial latch member (22) in a second position in said forwardly folded position for automatically locking said back frame member (18) in said forwardly folded position 2. An assembly as set forth in claim 1 further characterized by including release means for manually removing said inertia latch member (22) from said second position for allowing return of said back frame member (18) from said forwardly folded position to said upright position.

3. An assembly as set forth in claim 2 further characterized by said inertia latch member (22) including an abutment portion (26) and said support frame (12) including a rear shoulder (28), said abutment portion (26) engaging said rear shoulder (28) when said assembly (10) is in said upright seating position.

4. An assembly as set forth in claim 3 further characterized by said locking means including a lip (34) presented by said support frame (12) for engaging said abutment portion (26) of said inertia latch member (22) for locking said back frame member (18) in said second position in said forwardly folded position.

5. An assembly as set forth in claim 4 further characterized by said support frame (12) including a front shoulder (30) and said inertia latch member (22) including a lower head portion (32) engageable with said front shoulder (30) in said first position in response to said predetermined acceleration.

6. An assembly as set forth in claim 5 further characterized by said inertia latch member (22) including a counter weighted portion (44) to rotate said inertia latch member (22) in response to slow forward movement of said back frame member (18) at less than said predetermined acceleration to rotate said lower head portion (32) of said inertia latch member (22) over said front shoulder (30) of said support frame (12) to allow said back frame member (18) to move to said forwardly folded position.

7. An assembly as set forth in claim 6 further characterized by said release means being engageable with said inertia latch member (22) for rotating same from said first coacting position to move said lower head portion (32) out of engagement with said front shoulder (30) and allow said back frame member (18) to move from said upright position to said forwardly folded position.

8. An assembly as set forth in claim 7 further characterized by said inertia latch member (12) including a primary cam surface (46) for engaging said rear shoulder (28) to rotate and guide said inertia latch member (22) and to allow said lower head portion (32) to pass over said front shoulder (30) in response to said slow forward movement of said back frame member.

9. An assembly as set forth in claim 8 further characterized by said release means comprising a lever member (36) pivotally mounted on said back frame member (18), said lever member (36) including a hook (40) for engaging said inertia latch member and a tail (42) extending from said hook (40) and protruding from said back frame member (18) for applying manual forces thereto to rotate said inertia latch member (32).

10. An assembly as set forth in claim 9 further characterized by said inertia latch member (22) including an upper head portion (48) for being engaged by said hook (40) of said lever member (36) for rotating said inertia latch member (22) in response to forces applied to said upper head portion (48) by said lever member (36).

11. An assembly as set forth in claim 10 further characterized by the upper portion of said support frame (12) extending from said rear shoulder (28) through a valley portion (50) and upwardly to a plateau (52), said plateau (52) defining a base extending from the lower end of said front shoulder (30).

12. An assembly as set forth in claim 11 further characterized by said upper portion of said support frame (12) further extending curvalinerly from said shoulder to said lip (34).

13. An assembly as set forth in claim 12 further characterized by said primary cam surface (46) being generally m-shaped.

14. An assembly as set forth in claim 13 further characterized by said lower head portion (32) and said upper head portion (48) defining a generally c-shaped recess (54) therebetween.

15. An assembly as set forth in claim 14 further characterized by said inertia latch member (22) having a pin (24) therethrough for pivotally connecting same to said back frame member (18), said pin (24) being between said lower head portion (32) and said abutment portion (26).

16. An assembly as set forth in claim 15 further characterized by said back frame member (18) including a stop (41) for limiting the upward pivotal movement of said lever member (36).

17. An assembly as set forth in claim 16 further characterized by said upper portion of said support frame (12) further extending from said lip (34) to an end (56).

* * * * *